United States Patent
Yan

(10) Patent No.: US 10,521,639 B2
(45) Date of Patent: Dec. 31, 2019

(54) REDUCTION OF NOISE INTERFERENCE FOR FINGERPRINT SENSING

(71) Applicant: Image Match Design Inc., Zhubei, Hsinchu County (TW)

(72) Inventor: Yehsuan Yan, Taichung (TW)

(73) Assignee: IMAGE MATCH DESIGN INC., Zhubei, Hsinchu County (TW)

( * ) Notice: Subject to any disclaimer, the term of this patent is extended or adjusted under 35 U.S.C. 154(b) by 154 days.

(21) Appl. No.: 15/946,144

(22) Filed: Apr. 5, 2018

(65) Prior Publication Data

US 2018/0293419 A1    Oct. 11, 2018

(30) Foreign Application Priority Data

Apr. 5, 2017  (TW) .............................. 106111365 A

(51) Int. Cl.
*G06K 9/00* (2006.01)
*G06K 9/28* (2006.01)
*G06K 9/40* (2006.01)

(52) U.S. Cl.
CPC ....... *G06K 9/0002* (2013.01); *G06K 9/00013* (2013.01); *G06K 9/00026* (2013.01); *G06K 9/28* (2013.01); *G06K 9/40* (2013.01)

(58) Field of Classification Search
CPC .... G06K 9/0002; G06K 9/00013; G06K 9/40; G06K 9/28; G06K 9/00026; G06K 9/00006
See application file for complete search history.

(56) References Cited

U.S. PATENT DOCUMENTS

2003/0099380 A1*  5/2003  Gozzini ............... G06K 9/0002
                                                                    382/124
2019/0325184 A1* 10/2019  Yan ....................... G06K 9/0002

* cited by examiner

*Primary Examiner* — Phuoc Tran
(74) *Attorney, Agent, or Firm* — Muncy, Geissler, Olds & Lowe, P.C.

(57) ABSTRACT

In a fingerprint sensor, two adjacent sensing plates are detected at a same time to obtain first sensing data and second sensing data therefrom respectively, so that the first sensing data and the second sensing data include a same noise, then the first sensing data is subtracted from the second sensing data to generate a difference by which the noise is eliminated, and the difference is added to first fingerprint data corresponding to the sensing plate which provides the first sensing data, resulting in second fingerprint data corresponding to the other sensing plate. The fingerprint portions on the two adjacent sensing plates are determined according to the first and the second fingerprint data respectively.

14 Claims, 9 Drawing Sheets

REDUCTION OF NOISE INTERFERENCE FOR FINGERPRINT SENSING

CROSS-REFERENCE TO RELATED APPLICATIONS

This application claims the priority benefit of Taiwan Application No. 106111365, filed 5 Apr. 2017, the contents of which in its entirety are herein incorporated by reference.

FIELD OF THE INVENTION

The present invention generally relates to circuit and method for fingerprint sensing and, more particularly, to reduction of noise interference for fingerprint sensing.

BACKGROUND OF THE INVENTION

While detecting fingerprints, a fingerprint sensor may generate inaccurate sensing results due to noise in the power source or in the environment. To reduce such noise interference, many methods can be used nowadays. For example, the circuits in a fingerprint sensor and the finger whose fingerprint is to be sensed can be provided with the same ground potential by a common ground plate in order to eliminate some of the noise. However, the use of a common ground plate requires additional steps in the sensor manufacturing process, incurs extra cost, and takes up certain space. This is why common ground plates are no longer suitable for use when the volume of circuits is gradually reduced.

U.S. Pat. No. 7,460,697 reduces noise interference by adding more sensing plates, but this approach is costly and complicates the sensor manufacturing process even more. U.S. Pat. No. 8,787,632 reduces noise interference by sensing fingerprints while noise is relatively low, but the avoidance of noise prolongs the sensing time. U.S. Pat. No. 4,811,414 uses an averaging method to reduce noise interference, and yet the fluctuation of noise over time makes it impossible to reduce noise interference effectively. It has also been proposed to eliminate the noise in the sensing data of each sensing plate by an oversampling or averaging method, but the sensing time required to obtain fingerprint data from all the sensing plates will be exceedingly long.

Therefore, it is desired a more effective and simpler method for reduction of noise interference for fingerprint sensing.

SUMMARY OF THE INVENTION

One objective of the present invention is to provide circuit and method by which noise interference in a fingerprint sensor is reduced.

According to the present invention, to reduce noise interference in a fingerprint sensor, a method comprises simultaneously detecting two adjacent sensing plates to obtain first sensing data and second sensing data therefrom respectively, then extracting a first difference between the second sensing data and the first sensing data, combining the first difference with first fingerprint data to obtain second fingerprint data, and determining a fingerprint portion on the first sensing plate and a fingerprint portion on the second sensing plate according to the first fingerprint data and the second fingerprint data respectively.

According to the invention, a fingerprint sensor includes two adjacent sensing plates, two sensing circuits connected to the two sensing plates respectively, a subtractor connected to the two sensing circuits, and an adder connected to the subtractor, wherein the first sensing circuit and the second sensing circuit simultaneously detect the first sensing plate and the second sensing plate, thereby generating first sensing data and second sensing data therefrom respectively, the subtractor subtracts the first sensing data from the second sensing data to generate a difference, and the adder adds the difference to first fingerprint data to generate second fingerprint data. The first fingerprint data is used to determine the fingerprint portion on the first sensing plate, and the second fingerprint data is used to determine the fingerprint portion on the second sensing plate.

Taking advantages of the phenomenon that two adjacent sensing plates are susceptible to a same noise at a same time point, the present invention subtracts the first sensing data from the second sensing data (which two sets of sensing data are detected at a same time point) to obtain a noise-free difference so that, once a noise-free first fingerprint data corresponding to the fingerprint portion on the first sensing plate is obtained, a noise-free second fingerprint data corresponding to the fingerprint portion on the second sensing plate can be determined by calculation, and by doing so, the present invention reduces noise interference effectively. The first fingerprint data can be obtained by eliminating noise from the first sensing data, or preset reference values can be used as the first fingerprint data. Once the second fingerprint data is obtained, the foregoing steps can be repeated to obtain third fingerprint data, which corresponds to the fingerprint portion on a third sensing plate that is adjacent to the second sensing plate.

DETAILED DESCRIPTION OF THE INVENTION

Figure 1:
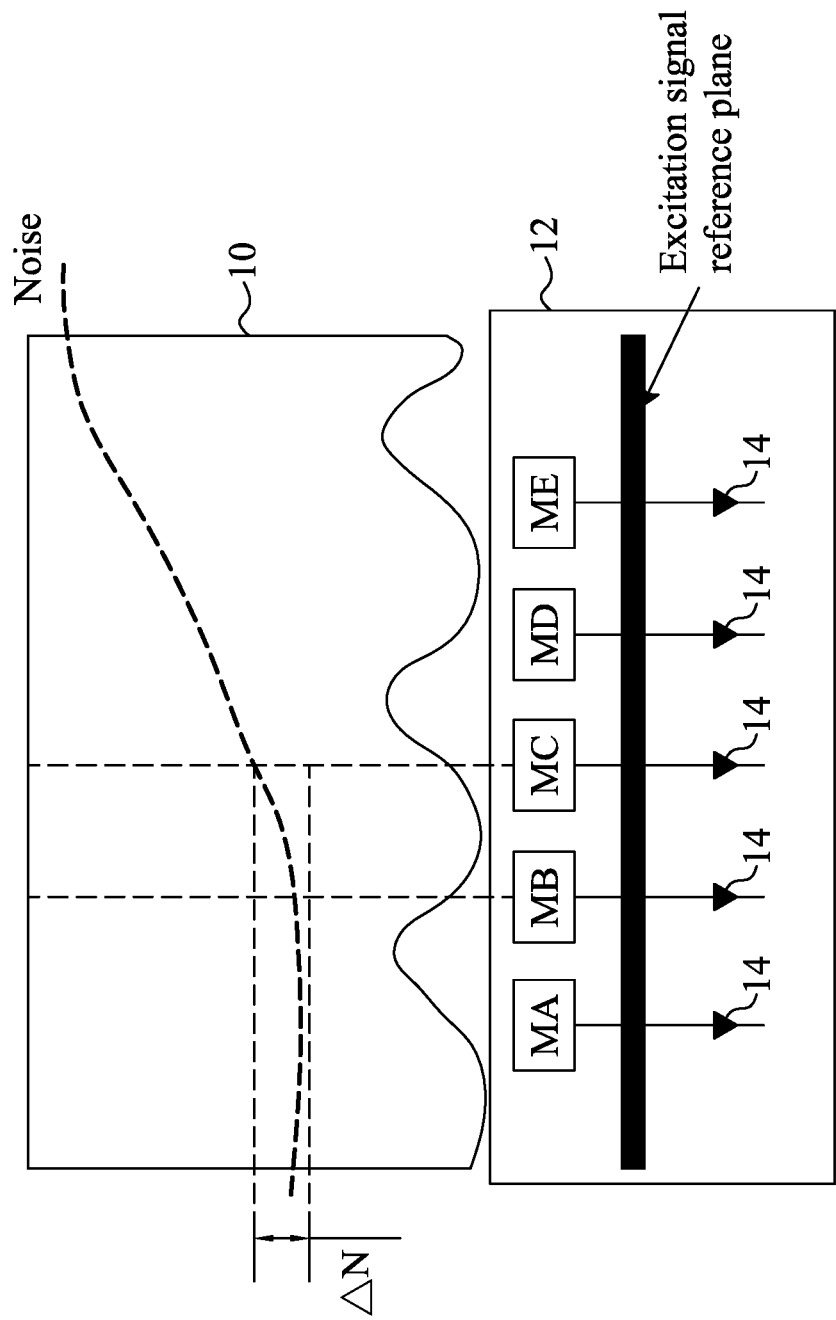
FIG. 1 shows the noise levels that exist concurrently at different positions in a fingerprint sensor.

As shown in FIG. 1, while a finger 10 is detected by a fingerprint sensor 12 for its fingerprint, the fingerprint sensor 12 is subject to noise interference from its power source or the environment. Further, the different sensing plates MA, MB, MC, MD, and ME may have errors resulted from the manufacturing process and thus, even though the sensing plates MA-ME are detected by different sensing circuits 14 of the fingerprint sensor 12 at a same time, the sensing data output from the sensing circuits 14 may show noise interference to various degrees. However, given that each two adjacent sensing plates are manufactured under almost identical conditions and are subject to virtually the same degree of noise interference from the power source or the environment, the noise in each two adjacent sensing plates at a same time point is practically the same. The present invention makes use of this phenomenon to eliminate noise interference and increase the signal-to-noise (S/N) ratio.

Figure 2:
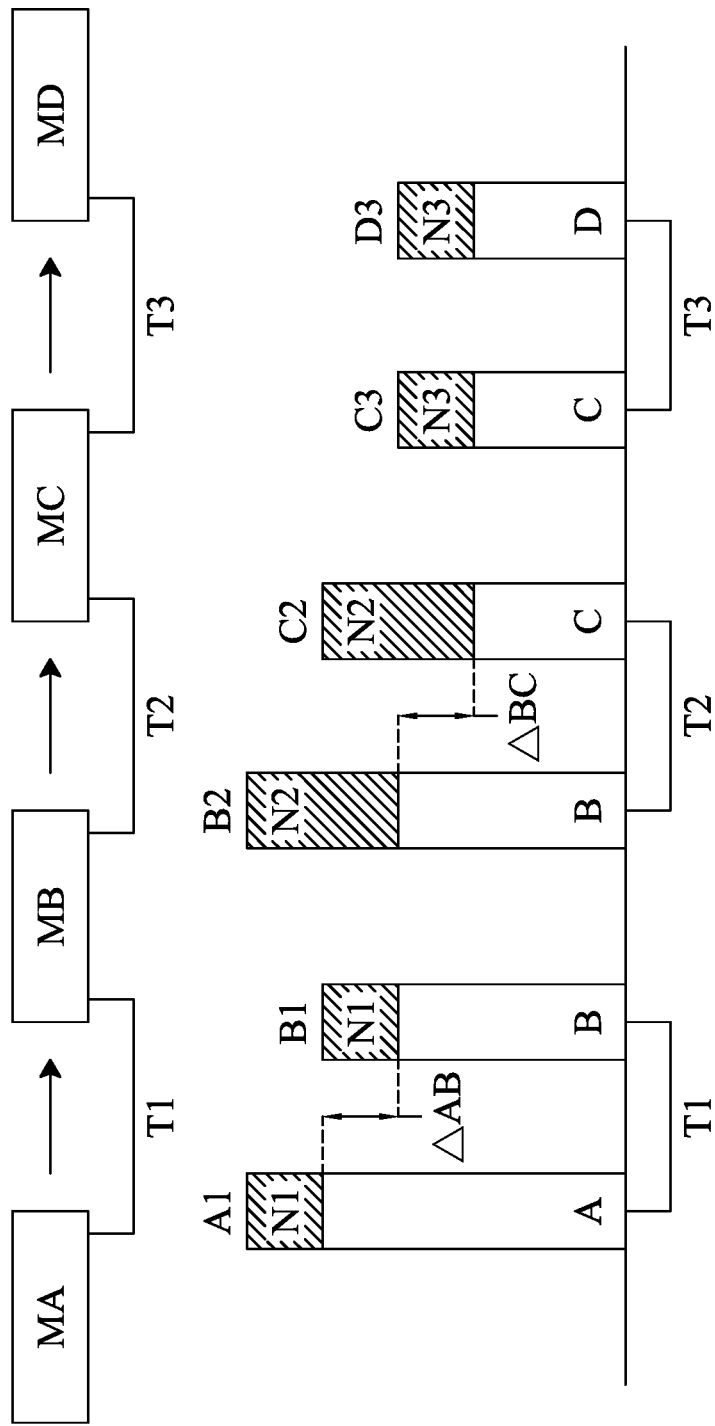
FIG. 2 illustrates the principle of the present invention.
Figure 3:
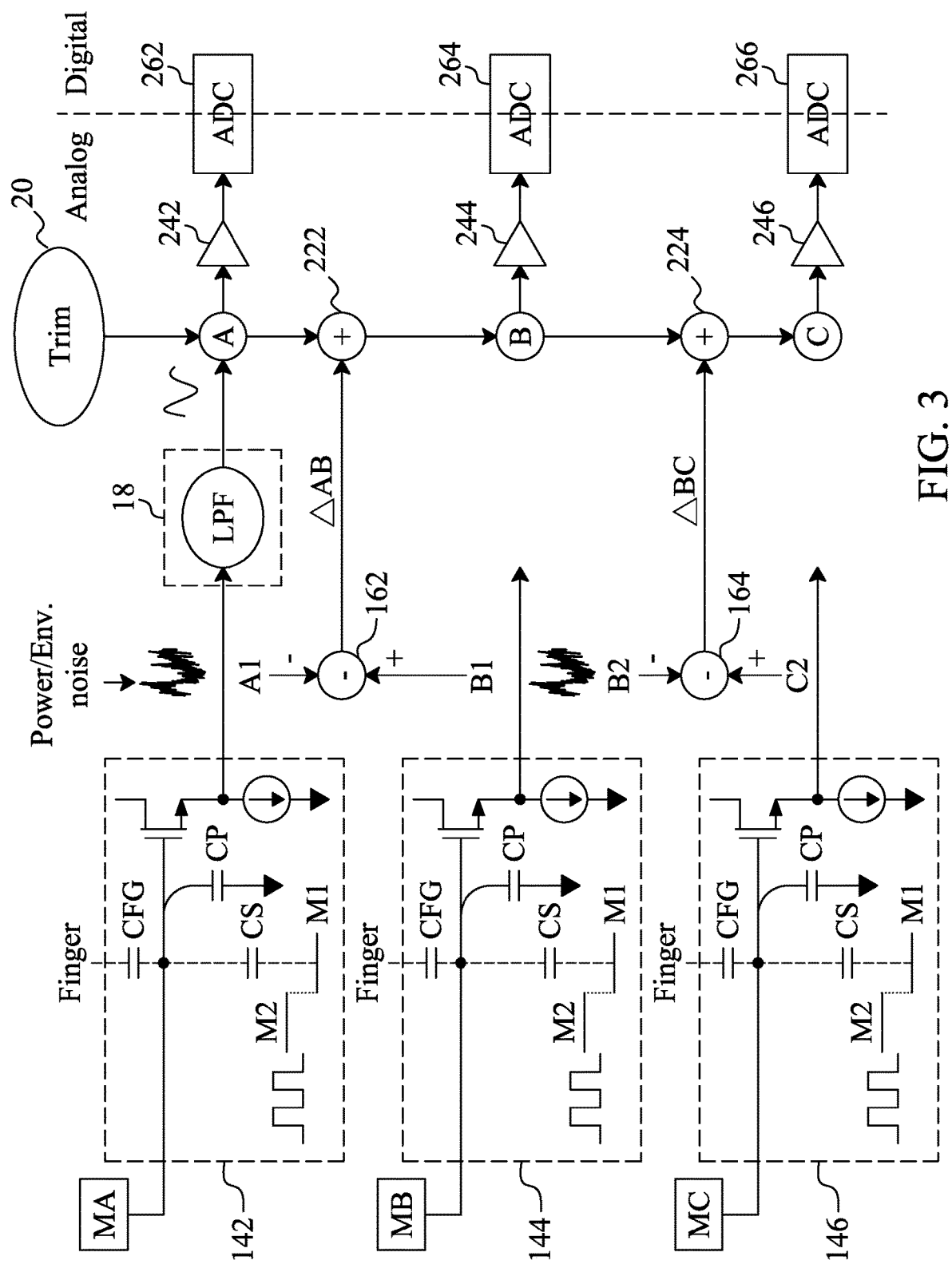
FIG. 3 shows a first embodiment of a fingerprint sensor according to the present invention.

Please refer to FIG. 2 for an illustration of the principle of the present invention and FIG. 3 for a first embodiment of the fingerprint sensor 12 according to the present invention. A first sensing circuit 142 and a second sensing circuit 144 detect a first sensing plate MA and a second sensing plate MB, respectively, at a same time point T1, to obtain first sensing data A1 of the first sensing plate MA and second sensing data B1 of the second sensing plate MB, wherein the first and the second sensing circuits 142 and 144 are connected to the first and the second sensing plates MA and MB respectively. As the first sensing plate MA and the second sensing plate MB are adjacent to each other, the first sensing data A1 and the second sensing data B1 have a same noise. As shown in FIG. 2, the first sensing data A1 includes first fingerprint data A and noise N1, and the second sensing data B1 includes second fingerprint data B and the same noise N1. The subtractor 162 subtracts the first sensing data A1 from the second sensing data B1 to generate their difference ΔAB. It can be clearly seen in FIG. 2 that the difference ΔAB obtained by subtracting the first sensing data A1 from the second sensing data B1 is the difference between the first fingerprint data A and the second fingerprint data B. Therefore, the obtainment of one of the first fingerprint data A and the second fingerprint data B enables calculation of the other of the two sets of fingerprint data. In this embodiment, the first fingerprint data A is obtained by a noise elimination circuit 18 eliminating the noise N1 from the first sensing data A1, and the second fingerprint data B is subsequently obtained by the adder 222 adding the difference ΔAB to the first fingerprint data A. In other embodiments, it is feasible to first obtain the second fingerprint data B by eliminating the noise N1 from the second sensing data B1 and then derive the first fingerprint data A from the second fingerprint data B and the difference ΔAB. Nowadays, the noise N1 in the first sensing data A1 can be eliminated in many ways, such as by an oversampling or averaging method. In this embodiment, the noise elimination circuit 18 uses a low-pass filter (LPF) to eliminate the noise N1. Furthermore, the adjustment circuit 20 can adjust (e.g., amplify, reduce, or shift) the first fingerprint data A as needed. The first fingerprint data A and the second fingerprint data B are fed through buffers 242 and 244 into analog-to-digital converters (ADCs) 262 and 264 respectively. Now that the first fingerprint data A and the second fingerprint data B are free of noise, buffers with relatively high gain can be used as the buffers 242 and 244 for signal amplification. The ADCs 262 and 264 convert the first fingerprint data A and the second fingerprint data B respectively into digital data so that subsequent steps can be performed to determine the fingerprint portion on the first sensing plate MA and the fingerprint portion on the second sensing plate MB. Fingerprint identification through the processing of fingerprint data is well known in the art and therefore will not further explained.

With continued reference to FIG. 2 and FIG. 3, the second sensing circuit 144 and the third sensing circuit 146 detect the adjacent second sensing plate MB and third sensing plate MC, respectively, at a same time point T2, to obtain third sensing data B2 of the second sensing plate MB and fourth sensing data C2 of the third sensing plate MC, with noise N2 present in the fourth sensing data C2 as well as in the third sensing data B2. The second subtractor 164 subtracts the third sensing data B2 from the fourth sensing data C2 to obtain the difference ΔBC, and the second adder 224 adds the difference ΔBC to the previously determined second fingerprint data B to obtain third fingerprint data C. The third fingerprint data C is fed through the buffer 246 into the ADC 266, where the third fingerprint data C is converted into digital data so that subsequent steps can be performed to determine the fingerprint portion on the third sensing plate MC. In the embodiment shown in FIG. 3, the fingerprint data A, B, and C has their respective buffers 242, 244, and 246 and their respective ADCs 262, 264, and 266. In other embodiments, different sets of fingerprint data may share a common buffer and a common ADC instead.

In the embodiment shown in FIG. 2 and FIG. 3, the fingerprint data of the sensing plate MA is obtained before the fingerprint data of the sensing plates MB-MD is calculated in a left-to-right order. In other embodiments, it is feasible to first obtain the fingerprint data of the sensing plate MD and then calculate the fingerprint data of the sensing plates MC-MA in a right-to-left order. In either case, the relatively complicated process of noise elimination only has to be performed on the sensing data of one sensing plate to obtain the corresponding fingerprint data, and the fingerprint data of the other sensing plates can be calculated by performing the relatively simple processes of subtraction and addition on the fingerprint data obtained. Since there is no need to carry out the relatively complicated process on the sensing data of each sensing plate, the sensing time required in the foregoing embodiments is shorter than in the prior art.

The present invention calculates fingerprint data according to the difference between the sensing data of each two adjacent sensing plates, so the "no common ground" problem does not exist; that is to say, whether the sensing plates and the finger whose fingerprint is to be sensed have a common ground or not makes no difference. A common ground plate is therefore not required. In addition, it can be known from the embodiment shown in FIG. 2 and FIG. 3 that, after the correct fingerprint data B is determined, the noise N1 can be obtained through reverse calculation, i.e., N1=B1−B, so that the frequency, pattern, and cause of the noise N1 can be further analyzed.

Figure 4:
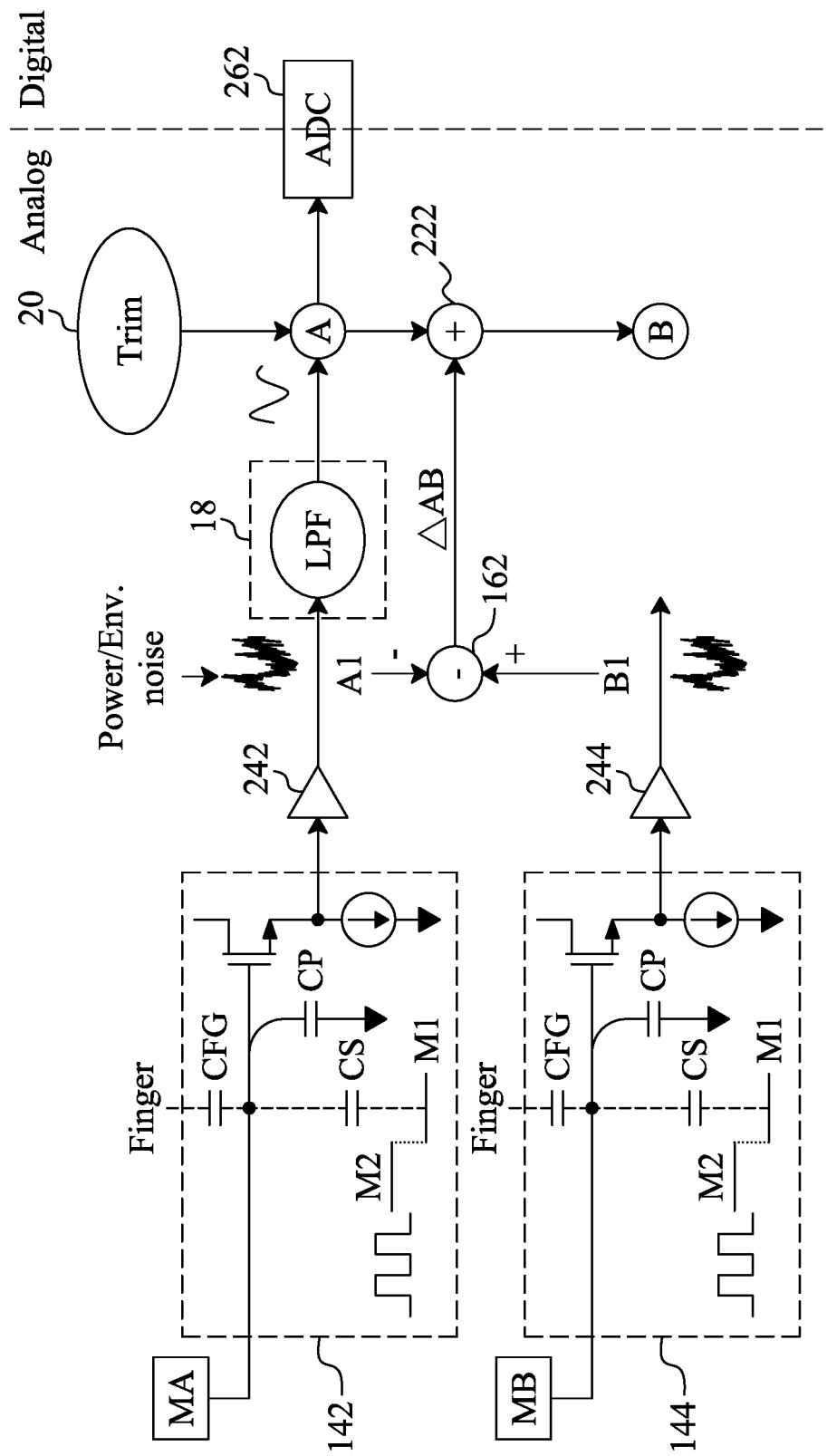
FIG. 4 shows a second embodiment of a fingerprint sensor of the present invention.

FIG. 4 shows the second embodiment of the fingerprint sensor 12. The circuitry in this embodiment is identical to that in FIG. 3 except that the buffers 242 and 244 in FIG. 4 are connected to the sensing circuits 142 and 144 respectively, and that therefore the sensing data A1 and B1 output respectively from the sensing circuits 142 and 144 will go through the buffers 242 and 244 respectively before noise elimination (i.e., the subtraction and addition operations).

Figure 5:
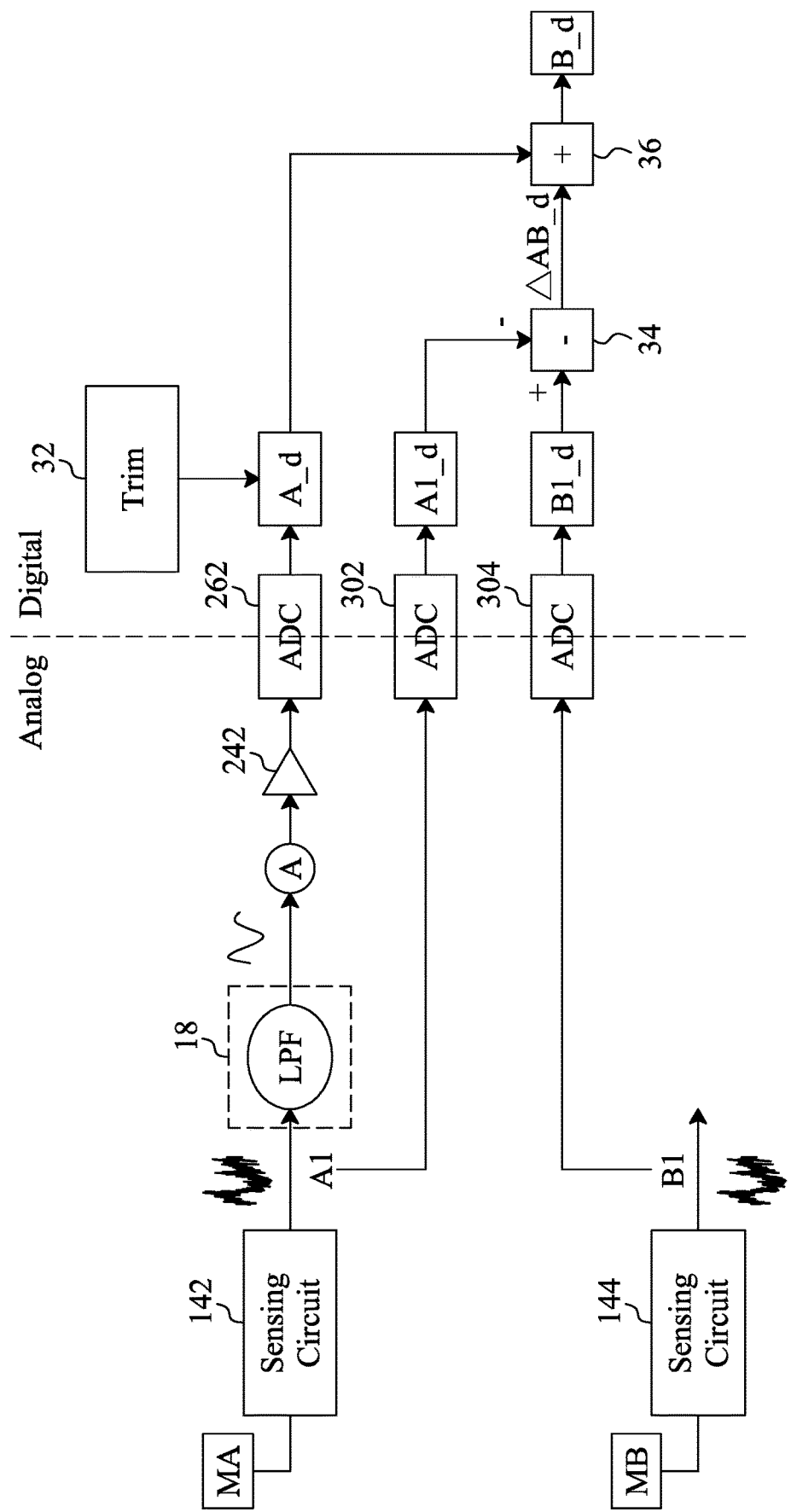
FIG. 5 shows a third embodiment of a fingerprint sensor according to the present invention.

FIG. 5 shows the third embodiment of the fingerprint sensor 12. The circuitry in this embodiment is different from that in FIG. 3 in that the fingerprint sensor in FIG. 5 uses a digital circuit to perform subtraction and addition for noise elimination. In FIG. 5, the first sensing data A1 detected by the first sensing circuit 142 goes through the noise elimination circuit 18 to have noise filtered out and thereby generate the first fingerprint data A. The first fingerprint data A is then fed through the buffer 242 into the ADC 262, in order for the ADC 262 to convert the first fingerprint data A into the digital first fingerprint data A_d, and for the digital adjustment circuit 32 to adjust the digital first fingerprint data A_d as needed. More specifically, the first sensing circuit 142 and the second sensing circuit 144 sense the adjacent sensing plates MA and MB respectively at the same time to generate the first sensing data A1 of the sensing plate MA and the second sensing data B1 of the sensing plate MB, which two sets of sensing data include the same noise N1. The first sensing data A1 and the second sensing data B1 are then converted into the digital first sensing data A1_d and the digital second sensing data B1_d by the ADCs 302 and 304 respectively. As the first sensing data A1 and the second sensing data B1 have the same noise N1, the first sensing data A1_d and the second sensing data B1_d obtained by ADC conversion have the same noise N1_d, too. The digital subtractor 34 subtracts the first sensing data A1_d from the second sensing data B1_d to generate the difference ΔAB_d, which no longer includes the noise N1_d, and the digital adder 36 adds the difference ΔAB_d to the first fingerprint data A_d to generate the second fingerprint data B_d, thereby allowing the fingerprint sensor 12 to determine the fingerprint portions on the sensing plates MA and MB according to the first fingerprint data A_d and the second fingerprint data B_d respectively.

Figure 6:
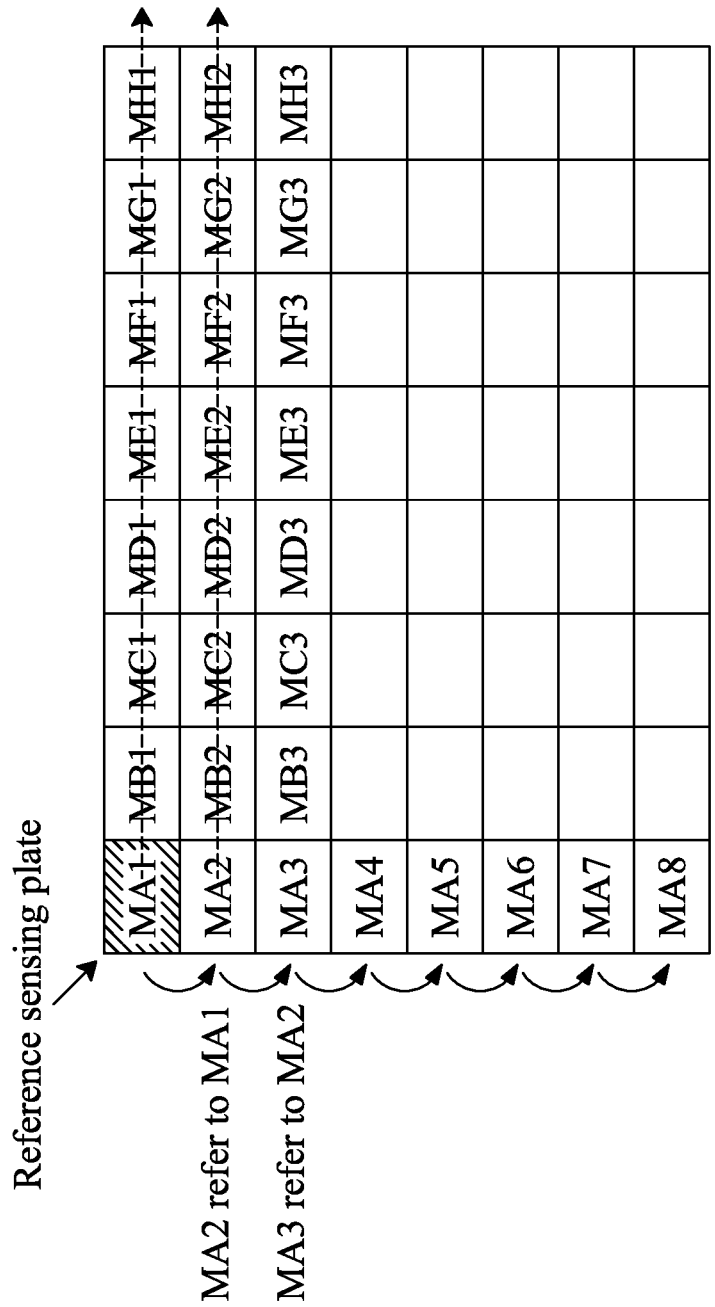
FIG. 6 shows a first embodiment of a scanning method of a fingerprint sensor according to the present invention.
Figure 7:
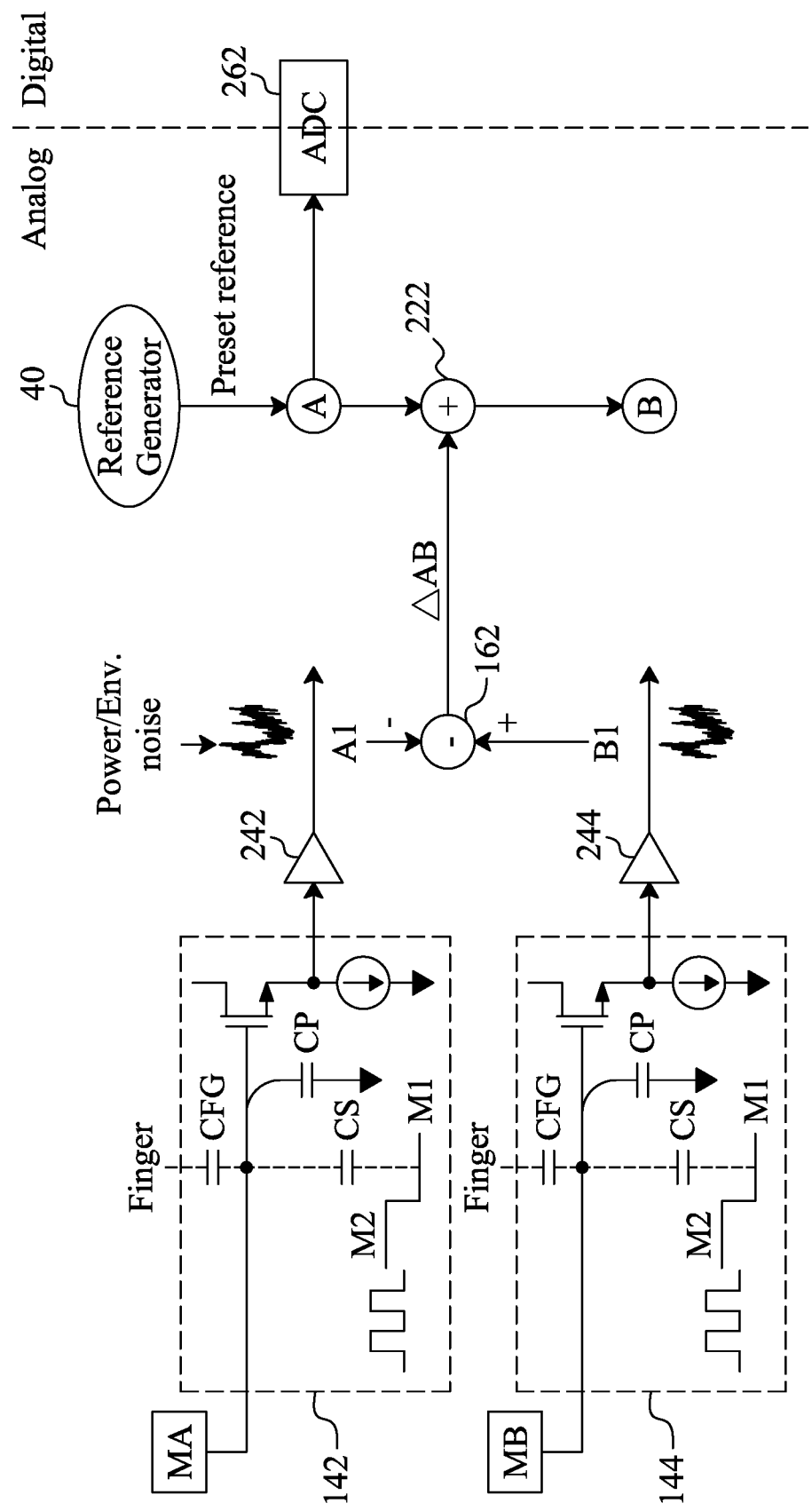
FIG. 7. shows a fourth embodiment of a fingerprint sensor according to the present invention.

Please refer to FIG. 6 for the first embodiment of the scanning method of the fingerprint sensor of the present invention. The first sensing plate MA1 in the first row is used as the reference sensing plate. Once the noise-free fingerprint data of the sensing plate MA1 is obtained, the circuitry in FIG. 3 detects the sensing data of the adjacent sensing plates MA1 and MB1 simultaneously and calculates the fingerprint data of the sensing plate MB1 according to the difference between the two sets of sensing data and the fingerprint data of the sensing plate MAL After that, the fingerprint data of the sensing plate MC1 is derived from the difference between the sensing data detected simultaneously from the sensing plates MB1 and MC1, and similar steps can be carried out to obtain the fingerprint data of all the remaining sensing plates MD1-MH1 in the first row. Likewise, the first sensing plate MA2 in the second row is adjacent to the sensing plate MA1, so the same method can be applied to derive the fingerprint data of the sensing plate MA2 from that of the sensing plate MA1, and in turn, the fingerprint data of the sensing plate MA2 can be used to calculate the fingerprint data of all the remaining sensing plates MB2-MH2 in the second row and of the sensing plate MA3 in the third row. Thus, the fingerprint data of all the sensing plates can be obtained. In this embodiment, the fingerprint data of each sensing plates is calculated from that of an adjacent sensing plate; as a result, scanning noise is reduced, and the scan line effect is minimized. Moreover, the fingerprint data of all the sensing plates is derived from that of the reference sensing plate MA1 such that, even if the fingerprint data of the sensing plate MA1 has errors, all the fingerprint data will have the same errors, which has no effect on the determination of fingerprints. In other words, the present invention does not require highly accurate reference values. The fingerprint data of the sensing plate MA1 need not be generated by sensing a fingerprint and may be preset reference values instead. FIG. 7 shows the fourth embodiment of the fingerprint sensor 12 of the present invention. The circuitry in this embodiment is identical to that in FIG. 3 except that a reference value generator is used to provide preset reference values as the first fingerprint data A corresponding to the sensing plate MA. The difference ΔAB between the first sensing data A1 and the second sensing data B1 is added to the first fingerprint data A to obtain the second fingerprint data B corresponding to the sensing plate MB.

Figure 8:
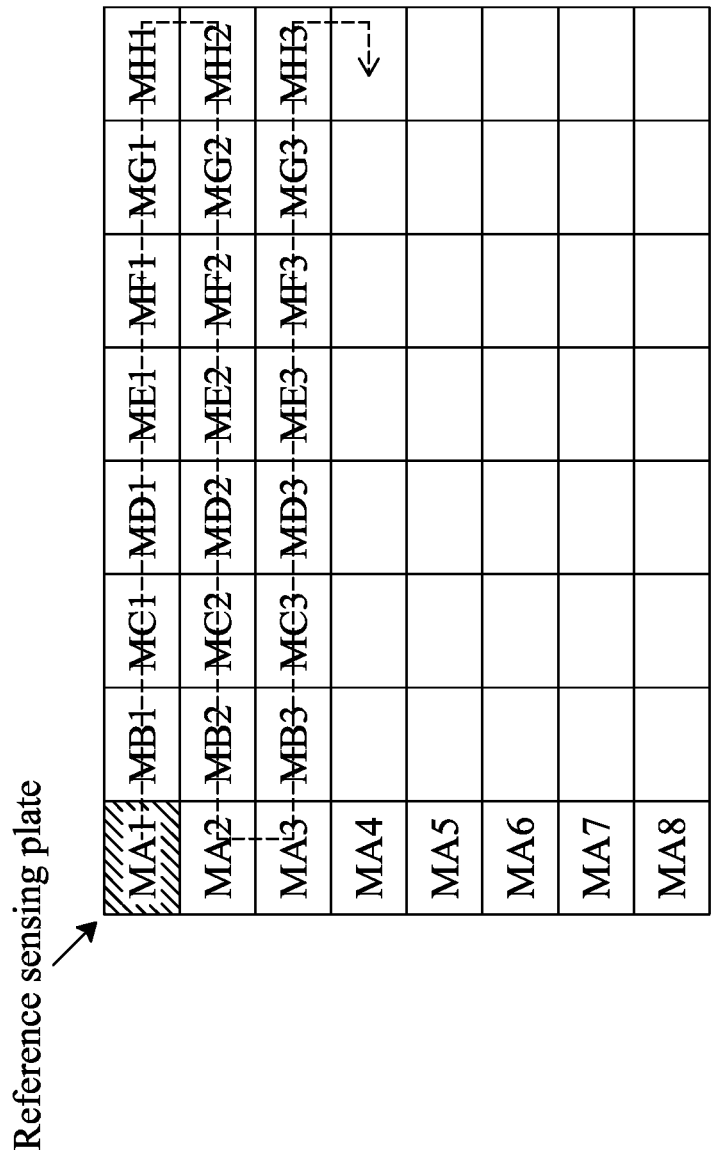
FIG. 8 shows a second embodiment of a scanning method of a fingerprint sensor according to the present invention.

FIG. 8 shows the second embodiment of the scanning method of the fingerprint sensor of the present invention, with the leftmost (or first) sensing plate MA1 in the first row serving as the reference sensing plate. After the noise-free fingerprint data of the sensing plate MA1 is obtained, the fingerprint data of the sensing plate MB1 is calculated from the fingerprint data of the sensing plate MA1 and the difference between the sensing data of the sensing plates MA1 and MB1. Following that, the fingerprint data of all the remaining sensing plates MC1-MH1 is determined in a left-to-right order, and once the fingerprint data of the sensing plate MH1 is obtained, the difference between the sensing data detected simultaneously from the sensing plates MH1 and MH2 is calculated so that the fingerprint data of the sensing plate MH2 can be determined. Similar steps are subsequently performed to calculate the fingerprint data of all the remaining sensing plates MG2-MA2 in the second row in a right-to-left order. Then, the fingerprint data of the sensing plate MA3 in the third row is derived from that of the sensing plate MA2. As the process continues along an S-shaped path, all the sensing plates will be scanned.

Figure 9:
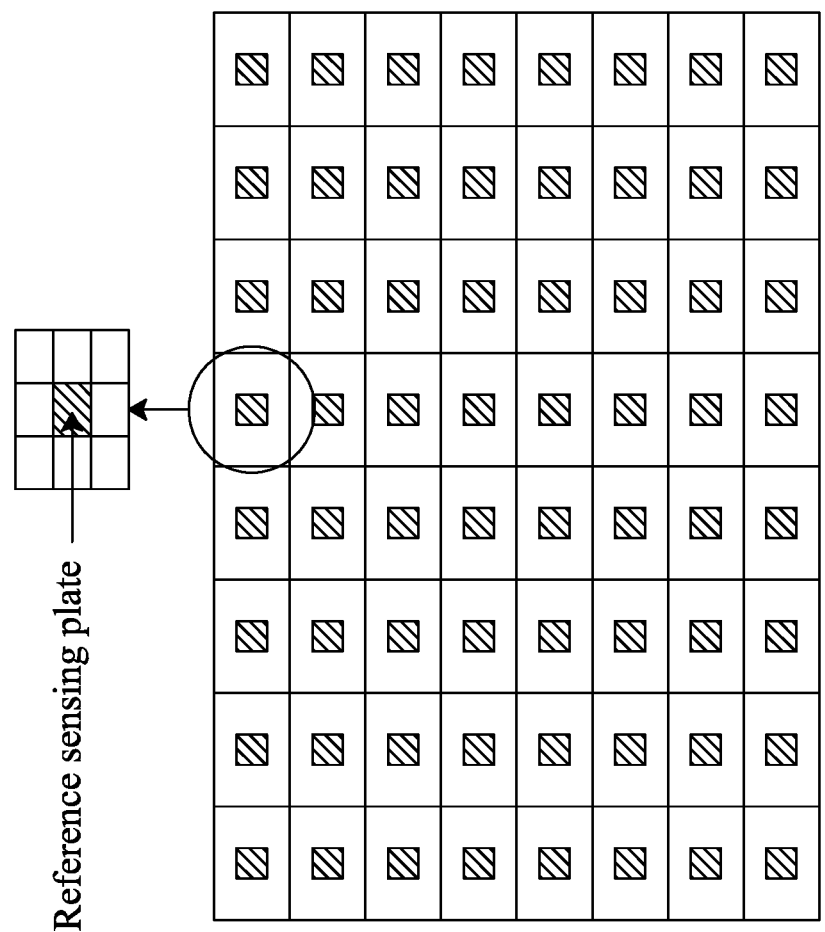
FIG. 9 shows a third embodiment of a scanning method of a fingerprint sensor according to the present invention.

FIG. 9 shows the third embodiment of the scanning method of the fingerprint sensor of the present invention. The fingerprint sensor in this embodiment includes a plurality of units each composed of nine sensing plates. The sensing plates in each unit are arranged in a 3×3 array (or an arbitrary array), with the central sensing plate serving as the reference sensing plate of the unit. Once the fingerprint data of a reference sensing plate is known, the fingerprint data of the entire unit of sensing plates can be obtained by calculating the fingerprint data of each sensing plate adjacent to the reference sensing plate. This scanning method helps reduce errors associated with a shift in position in the manufacturing process.

What is claimed is:

1. A method for reducing noise interference in a fingerprint sensor having a plurality of sensing plates for fingerprint sensing, the method comprising steps of:
   simultaneously detecting a first sensing plate and a second sensing plate of the plurality of sensing plates, thereby obtaining first sensing data and second sensing data therefrom respectively, wherein the second sensing plate is adjacent to the first sensing plate;
   extracting a first difference between the second sensing data and the first sensing data;
   combining the first difference with first fingerprint data to obtain second fingerprint data; and
   determining a fingerprint portion on the first sensing plate and a fingerprint portion on the second sensing plate according to the first fingerprint data and the second fingerprint data respectively.

2. The method of claim 1, further comprising a step of eliminating noise from the first sensing data to obtain the first fingerprint data.

3. The method of claim 2, wherein the step of eliminating noise from the first sensing data comprises a step of oversampling the first sensing data.

4. The method of claim 2, wherein the step of eliminating noise from the first sensing data comprises a step of averaging the first sensing data.

5. The method of claim 2, wherein the step of eliminating noise from the first sensing data comprises a step of filtering noise from the first sensing data with a low-pass filter.

6. The method of claim 1, further comprising a step of presetting the first fingerprint data.

7. The method of claim 1, further comprising steps of:
   simultaneously detecting the second sensing plate and a third sensing plate of the plurality of sensing plates, thereby obtaining third sensing data and fourth sensing data therefrom respectively, wherein the third sensing plate is adjacent to the second sensing plate;
   extracting a second difference between the fourth sensing data and the third sensing data;

combining the second difference with the second fingerprint data to obtain third fingerprint data; and determining a fingerprint portion on the third sensing plate according to the third fingerprint data.

8. A fingerprint sensor, comprising:

a first sensing plate;

a second sensing plate adjacent to the first sensing plate;

a first sensing circuit connected to the first sensing plate and configured to detect the first sensing plate;

a second sensing circuit connected to the second sensing plate and configured to detect the second sensing plate, wherein the first sensing circuit and the second sensing circuit simultaneously detect the first sensing plate and the second sensing plate, to generate first sensing data and second sensing data therefrom respectively;

a first subtractor connected to the first sensing circuit and the second sensing circuit, and configured to subtract the first sensing data from the second sensing data to thereby generate a first difference; and a first adder connected to the first subtractor, and configured to add the first difference to first fingerprint data to thereby generate second fingerprint data for use in determining a fingerprint portion on the second sensing plate, wherein the first fingerprint data is used to determine a fingerprint portion on the first sensing plate.

9. The fingerprint sensor of claim 8, further comprising a noise elimination circuit connected to the first sensing circuit, wherein the noise elimination circuit is configured to eliminate noise from the first sensing data to thereby generate the first fingerprint data.

10. The fingerprint sensor of claim 9, wherein the noise elimination circuit oversamples the first sensing data to eliminate noise from the first sensing data.

11. The fingerprint sensor of claim 9, wherein the noise elimination circuit averages the first sensing data to eliminate noise from the first sensing data.

12. The fingerprint sensor of claim 9, wherein the noise elimination circuit comprises a low-pass filter for filtering noise from the first sensing data.

13. The fingerprint sensor of claim 8, wherein the first fingerprint data is preset.

14. The fingerprint sensor of claim 8, further comprising:

a third sensing plate adjacent to the second sensing plate;

a third sensing circuit connected to the third sensing plate and configured to detect the third sensing plate, wherein the second sensing circuit and the third sensing circuit simultaneously detect the second sensing plate and the third sensing plate, to generate third sensing data and fourth sensing data therefrom respectively;

a second subtractor connected to the second sensing circuit and the third sensing circuit, and configured to subtract the third sensing data from the fourth sensing data to thereby generate a second difference; and a second adder connected to the first adder and the second subtractor, and configured to add the second difference to the second fingerprint data to thereby generate third fingerprint data for use in determining a fingerprint portion on the third sensing plate.

* * * * *